United States Patent [19]
Heiart

[11] 3,833,441
[45] Sept. 3, 1974

[54] THERMOGRAPHIC PROCESSES

[75] Inventor: Robert Bernard Heiart, Middletown, N.J.

[73] Assignee: E. I. du Pont de Nemours and Company, Wilmington, Del.

[22] Filed: May 7, 1971

[21] Appl. No.: 141,211

Related U.S. Application Data

[63] Continuation-in-part of Ser. No. 232,678, Oct. 24, 1962, abandoned.

[52] U.S. Cl. .......................... 156/234, 96/28, 96/47, 101/470, 117/1.7, 117/17.5, 117/36.1, 156/272, 250/317

[51] Int. Cl.... B41m 5/26, B32b 31/26, B32b 31/28

[58] Field of Search ......... 117/1.7, 17.5, 36.1, 36.7, 117/36.8, 47 H, 122 H; 250/65 T, 317, 318; 101/470, 471, 467; 96/28, 47; 156/230, 234, 272

[56] References Cited

UNITED STATES PATENTS

| | | | |
|---|---|---|---|
| 3,060,023 | 10/1962 | Burg et al. | 117/1.7 UX |
| 3,060,024 | 10/1962 | Burg et al. | 117/1.7 UX |
| 3,060,025 | 10/1962 | Burg et al. | 117/1.7 UX |
| 3,060,026 | 10/1962 | Heiart | 96/28 |
| 3,073,953 | 1/1963 | Cohen et al. | 250/65 T |
| 3,081,699 | 3/1963 | Gulko | 117/1.7 |
| 3,089,952 | 5/1963 | Wartman et al. | 250/65 T |
| 3,206,601 | 9/1965 | Gold | 250/65 T |
| 3,223,526 | 12/1965 | Grieshaber et al. | 96/46 |
| 3,260,612 | 7/1966 | Dulmage et al. | 117/33 X |

OTHER PUBLICATIONS

Modern Plastics Encyclopedia and Engineers Handbook 1952, Plastics Catalogue Corporation, New York, N.Y. pp. 696, 702, 703, TP 986 A2M5C.4.

*Primary Examiner*—Charles E. Van Horn
*Assistant Examiner*—Thomas E. Bokan

[57] ABSTRACT

This invention relates to a thermographic process of image formation and more particularly to such a process for forming images by heating, imagewise, to a temperature above a softening temperature, but below the thermal decomposition temperature, a solid layer of a mixture of a thermoplastic, amorphous, organic polymer and a liquid plasticizer therefor, the mixture being capable of existing in a metastable state and a stable state for a period sufficient to convert the stable polymer to the metastable state, heating the entire surface of the layer to a temperature between the softening temperatures of the stable and metastable state, and converting the softened exposed image areas to a visible image, e.g., by applying finely divided colored particles to the layer and removing them from nonexposed areas or thermally exposed image areas are transferred to a separate image receptive surface. The simple procedure is a dry process, and images of high quality and stability are obtained rapidly.

5 Claims, 1 Drawing Figure

PATENTED SEP 3 1974 3,833,441
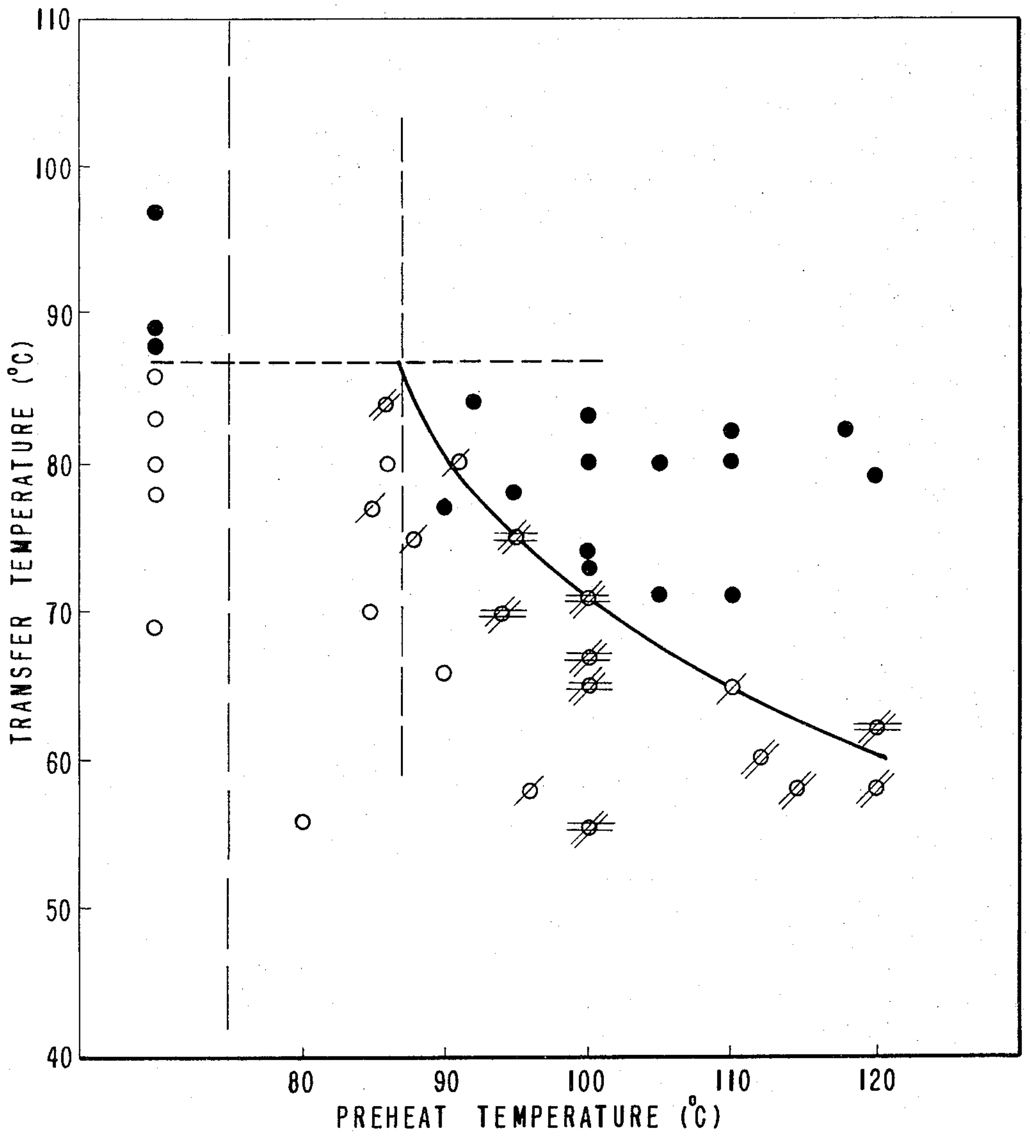
INVENTOR
ROBERT BERNARD HEIART
BY Lynn Barratt Morris
ATTORNEY

THERMOGRAPHIC PROCESSES

This application is a continuation-in-part of Ser. No. 232,678, filed Oct. 24, 1962, for THERMOGRAPHIC PROCESSES AND ELEMENTS, now abandoned.

This invention relates to a thermographic process of image formation and more particularly to such a process wherein thermally exposed image areas are transferred to a separate image-receptive surface. The invention also relates to new thermographic image-forming elements.

An object of this invention is to provide a new practical and simple dry thermographic process for forming images.

Another object is to provide a process whereby said image is formed by the imagewise thermal transfer of meta-stable material to any of a wide variety of readily available, inexpensive supports. Yet another object is to provide a process giving a copy which is right-reading when viewed from the message side of the copy. A further object is to provide a copy which has handling characteristics similar to the original. A still further object is to provide a wholly thermographic process which produces a copy free from objectionable background and which can be made with a variety of image and background color combinations, pleasing appearance and good legibility. Still other objects will be apparent from the following description of the invention.

The image-forming process of this invention comprises 1. heating, imagewise, to a temperature above a softening temperature $T_2$ but below the thermal decomposition temperature thereof, a layer that is solid at normal pressure below 40°C. comprising a mixture of a thermoplastic organic polymer of a molecular weight above 10,000 and a normally liquid plasticizer therefor, said mixture being capable of existing (a) in a metastable state at 20°C. having a softening temperature $T_1$ and (b) in a stable state at 20°C., having a softening temperature $T_2$ at least 10° above $T_1$ while said polymer is in the latter stable higher softening state, for a period sufficient to convert the stable polymer to the metastable state, usually for a millisecond to 60 seconds,
2. bringing the entire surface of the layer to a temperature T between temperatures $T_1$ and $T_2$, whereby the imagewise heated areas are softened and will adhere to various surfaces, e.g., glass, fibrous and porous surfaces and to inert particles, and the remaining areas are firm and non-adherent, and
3. converting the softened, exposed image areas to a visible image.

Step (3) can be accomplished (i) by applying finely divided particles (preferably colored particles) to the surface of the layer and removing the particles from the nonexposed areas, (ii) by transferring the exposed image areas to the surface of a separate image-receptive element and by other procedures.

In the processes just described, the organic polymer/-plasticizer layer can be light-sensitive or light-insensitive. An imagewise thermal exposure causes a difference in the temperatures at which exposed and unexposed areas of the coating soften and become capable of transfer to a suitable receptive element. That portion of the thermoplastic mixture which has been heated above the softening temperature ($T_2$), upon subsequent cooling, has a lower softening temperature ($T_1$), which is definitely metastable. After a given time, it will revert to a stable state approaching the higher softening temperature ($T_2$) of the rawstock. The metastable state may revert to the more stable state in a matter of hours or days, but there is ample time to develop or amplify a visible image (e.g., by transfer of an image to a suitable support) by bringing the element to a temperature, (T), intermediate, e.g., between the softening temperatures of the stable and metastable states of the thermoplastic material.

Polymeric image-forming elements of the invention comprise a thin, flexible, infrared radiation-transmitting support bearing on at least one surface a layer solid below 40°C., from 0.01 to 10 mils in thickness and comprising:

A. A mixture of a thermoplastic organic polymer of molecular weight above 10,000 and a plasticizer therefor, said mixture being capable of existing (a) in a metastable state having a softening temperature $T_1$ and (b) in a stable state having a softening temperature $T_2$ at least 10°C. above $T_1$, and B. a dispersed colored material capable of absorbing light in the range from 350 to 700 millimicrons. The elements may also contain a finely dispersed infrared-absorbing material.

According to a further modification of the invention, the novel elements just described have in contact with the image-forming layer a thin, transparent sheet of fibrous material having a thickness of not more than 10 mils, e.g., a sheet of transparent or translucent paper.

A group of thermoplastic compositions which exhibit the two states of different softening temperatures and which are suitable for use in the present invention, comprise cellulose esters and their plasticizers and the polymeric compositions of the Examples.

To the thermoplastic composition there can be added non-thermoplastic polymer compounds to give certain desirable characteristics, e.g., to improve adhesion to the base support, adhesion to the receptor support on transfer, wear properties, chemical inertness, etc. Suitable non-thermoplastic polymeric compounds include cellulose, anhydrous gelatin, phenolic resins and melamineformaldehyde resins, etc. Also, the composition may contain immiscible polymeric or non-polymeric organic or inorganic fillers or reinforcing agents, e.g., the organophilic silicas, bentonites, silicone, powdered glass, colloidal carbon, as well as various types of dyes and pigments, in amounts varying with the desired properties of the thermoplastic layer. The fillers are useful in improving the strength of the composition, reducing tack and in addition, as coloring agents.

Among the useful dyes are Fuchsine (CI 42510), Auramine Base (CI 41000B), Calcocid Green S (CI 44090), Para Magenta (CI 42500), Tryparosan (CI 42505), New Magenta (CI 42520), Acid Violet RRL (CI 42425), Red Violet 5RS (CI 42690), Nile Blue 2B (CI 51185), New Methylene Blue GG (CI 51195), CI Basic Blue 20 (CI 42585), Iodine Green (CI 42556), Night Green B (CI 42115), CI Direct Yellow 9 (CI 19540), CI Acid Yellow 17 (CI 18965), CI Acid Yellow 29 (CI 18900), Tartrazine (CI 19140), Supramine Yellow G (CI 19300), Buffalo Black 10B (CI 27790), Naphthalene Black 12R (CI 20350), Fast Black L (CI 51215), and Ethyl Violet (CI 42600).

Suitable pigments include, e.g., $TiO_a$, colloidal or dispersed carbon (e.g., graphite), phosphor particles, ceramics, clays, metal powders such as aluminum, copper, magnetic iron and bronze, etc.

Color-forming components which form colored compounds on the application of heat or when brought in contact with other color-forming components on a separate support can be particularly useful when images are transferred to a receptor. Suitable components include, 1. Organic with Inorganic Components: dimethyl glyoxime and nickel salts; phenolphthaloin and sodium hydroxide; starch/potassium iodide and oxidizing agent, i.e., peroxides; phenols and iron salts; thioacetamide and lead acetate; silver salt and reducing agent e.g., hydroquinone.

2. Inorganic Components: ferric salts and potassium thiocyanate; ferrous salts and potassium ferricyanide; copper, mercury or silver salts and sulfide ions; lead acetate and sodium sulfide.

3. Organic Components: 2,4-dinitrophenylhydrazine and aldehydes or ketones; diazonium salt and phenol or napthol, e.g., benzenediazonium chloride and beta-napthol; substituted aromatic aldehydes or amines and a color photographic developer compound, e.g., p-dimethylaminobenzaldehyde and p-diethyleminoaniline; color photographic developer compound/active methylene compound and an oxidizing agent, e.g., p-diethylaminotoluidine/α-cyanoacetophenone and potassium persulfate.

The thermoplastic composition is preferably coated on a base support. Suitable support materials are stable at the operating temperatures used in the instant invention. Suitable bases or supports include those disclosed in U.S. Pat. No. 2,760,863, glass, wood, paper (including waxed or transparentized paper), cloth, cellulose esters, e.g., cellulose acetate, cellulose propionate, cellulose butyrate, etc., and other plastic compositions such as polyamides, polyesters, e.g., polyethylene terephthalate, etc. The support may have in or on its surface and beneath the heat sensitive layer, substrate needed to facilitate anchorage to the base.

Suitable image-receptive supports to which thermally exposed image areas may be transferred are disclosed in Assignee's Burg & Cohen, U.S. Pat. No. 3,060,023, Oct. 23, 1962. A preferred image-receptive support is smooth bond paper.

Reflex exposure techniques are especially useful in the present invention, particularly when office copies are made. By using reflex exposure, copies can be made from materials having messages on both sides of a page or from opaque supports, e.g., paper, cardboard, metal, etc. A suitable process for carrying out our step (1), i.e., the thermal exposure step, is disclosed in C. S. Miller, U.S. Pat. No. 2,740,896 of April 3, 1956, in which process one can use a commercial "Thermo-Fax" (Minnesota Mining and Manuf. Co.) thermographic copying machine.

An alternate method of providing the thermal exposure of step (1) is disclosed in Assignee's Cohen & Holland U.S. Pat. No. 3,073,953, Jan. 15, 1963, which relates to a process involving exposure by transmitted radiation (rather than by reflectographic exposure) in which a negative of the original image is obtained. The process of this application is versatile in that it can make either "contact" reproductions or reproductions which are enlarged or reduced from the size of the original by projection printing through a lens system.

A form of the element particularly useful for projection exposure contains a component which strongly absorbs infrared radiation. This component will then convert radiant infrared to heat and effect the change within the element. A similar situation exists where a strongly infrared-absorbing material is placed in thermal contact with the heat sensitive element. This can be done by over-or-under-coating the absorbing layer or by physically bringing a separate sheet into contact with the element at time of exposure as in the above Cohen & Holland U.S. Pat. No. 3,073,953.

Infrared absorbing materials can be used in the coatings for reflex exposure as well. Here, the infrared absorption is adjusted so that passage of the incident radiation through the element will raise its temperature to some value $T'$ close to but below the rawstock softening temperature $T_2$. Then the heat generated by the message areas of the original need only elevate the matrix temperature from $T'$ to a temperature above $T_2$ imagewise. This will greatly increase the system's sensitivity.

Similarly, the element may receive an overall heating in other ways, e.g., by passing over heated rolls prior to or during exposure, so that less image-wise heating is required to produce an adequate exposure. This procedure, known as "heat biasing," is useful in increasing sensitivity of the element for various types of subsequent exposure, e.g., reflectographic, exposure by transmitted light, or even exposure to hot type.

Another useful element, for reflex exposure, comprises an infrared "transparent" support bearing the heat sensitive layer which is further overlaid with a thin translucent paper capable of transmitting infrared radiation and heat. This is reflectographically exposed, paper side against the original, and then the message is transferred to the thin translucent paper as usual.

The process may be adapted for thermographic oscillographic recording, whereby a moving spot of infrared radiation impinges on a thermally sensitive element by reflection from a movable mirror. Also, the thermographic element can be contacted with a heated stylus, operated manually or mechanically, as a recording or copy arm of a sensing system driven by a photoelectric scanning beam. In a similar fashion, heated type characters, slugs, or complete composed plates may be pressed directly in contact with the thermographic element.

The invention will be further illustrated but is not intended to be limited by the following examples.

EXAMPLE I

A solution was prepared comprising the following ingredients:

74 g. acetone 25 g. cellulose acetate butyrate 0.4 g. Calcocid Green S Ex. Conc. Dye (CI Acid Green 50)

25 g. polyethylene glycol diacrylate (derived from polyethylene glycol with an average molecular weight of 300)

Acetone to 200 g.

The cellulose acetate butyrate contained about 20.5 percent acetyl groups, ca. 26 percent butyryl groups and had a viscosity of 9.0 to 13.5 poises as determined by ASTM method D-871-54T in the solution described as Formula A, ASTM method D-871-54T.

After a thorough stirring, the above solution was coated on a web of 0.001 inch thick vinylidene chloride/ethyl acrylate/itaconic acid coated polyethylene terephthalate base described in Alles U.S. Pat. No. 2,779,684 to a wet thickness of about 0.01 inch, and dried at room temperature.

One week later (more than ample time for the coated stratum to be entirely or predominantly in its relatively more stable, higher melting state), a sample of this thermographic film element was exposed reflectographically to a letter text original by exposure in a thermographic copying machine, for example, while it is at the Number 8 setting of a "Secretary Model 22 Thermo-Fax" machine of Minnesota Mining & Mfg. Co.) After exposure, the coated stratum of the thermographic element was placed in contact with a sheet of bond paper and the superposed elements were passed through pressure rollers at 96°C. at a speed of 30 in./min. and at a pressure of 1.6 lbs. per lineal inch. A sharp, green positive copy of the original image was thus formed by thermal transfer to the bond paper support.

EXAMPLE II

A graphic image-bearing original consisting of a graphite pencil line drawing on a thin sheet of infrared transmitting tracing paper was placed, image side down, on an ordinary glass plate in a thermographic copying machine ("Premier Model 19 Thermo-Fax" sold by Minnesota Mining & Mfg. Company). Over the graphic original there was placed a sheet of a vinylidene chloride copolymer coated, polyethylene terephthalate photographic film base such as described in Example I, which transmits infrared radiation but which serves as a thermal insulator. A sheet of the coated element described in Example I was, in turn, placed over the thermal insulator, coated side up. Finally, a thin sheet of infrared absorbing black paper was placed over the thermally sensitive element. After exposure at the No. 3 exposure setpoint of the thermographic copying machine, the thermographic element was placed in contact with a sheet of bond paper and a clear negative image of the graphic original was thermally transferred to the bond receptor paper support.

EXAMPLE III

The following ingredients were mixed in a high speed blending mixer of the type shown in Osius U.S. Pat. No. 2,109,501 (Waring Corp., New York, N.Y.) at room temperature:

47 g. acetone 8.4 g. polyethylene glycol (average molecular weight of 300)

8.4 g. cellulose acetate butyrate 0.09 g. Calcocid Green S. Ex. Conc. Dye (CI Acid Green 50) acetone up to 67 g. The cellulose acetate butyrate contained about 13 percent acetyl groups, about 37 percent butyryl groups and had a viscosity of 64 to 124 poises as determined by ASTM method D-871-54T in the solution described as Formula A. ASTM method D-871-54T. This solution was coated on 0.001 inch-thick polyethylene terephthalate film base to a wet thickness of about 0.01 inch which, upon drying, achieved a thickness of 0.0015 inch.

A strip cut two days later from the above coating was placed in contact with a black and white original and exposed reflectographically at the No. 2 setting of the thermographic copying machine described in Example I. A positive copy of the original image was then formed on a sheet of bond paper by thermal transfer as described in Example I, the roller temperature being 85°C. at a pressure of 1/6 lb./lineal inch.

EXAMPLE IV

A small sample of the coated element prepared in Example I was placed in contact with a piece of bond paper (coated side toward the bond paper) and the superposed elements were pressed together for 5 seconds with moderate pressure against the heated bar of a Dennis-Parr Melting Point Apparatus (Parr Instrument Co., Moline, Ill.). The temperature of the melting point apparatus at the point of contact was determined accurately by means of a copper-constantan thermocouple. No transfer occurred at a temperature of 69°C. after the 5 second time of contact (which was approximately the time required to reach temperature equilibrium).

The above procedure was repeated with other samples of the thermographic element at positions on the bar of progressively higher temperatures without any sign of transfer until at a bar temperature of 86°C., partial transfer occurred. At temperatures of 88°C. and 97°C., transfer occurred over the whole contacting areas. Thus, the minimum temperature required for good transfer must be somewhere between 86°C. and 88°C. This minimum temperature will be referred to as the rawstock softening or transfer temperature ($T_2$) for the particular element tested.

According to this invention, a minimum softening or transfer temperature ($T_1$) may be below the softening temperature of the layer of organic polymer ($T_2$) in those areas of the element which have received a previous exposure to heat above the rawstock softening temperature ($T_2$). Thus, imagewise thermal exposure of an element to a temperature above $T_2$ makes possible the subsequent imagewise transfer of the exposed areas at some transfer temperature (T) intermediate between $T_1$ and $T_2$. 35 small samples of the coating prepared in Example I were tested by preheating to various temperatures, cooling, and then transferring at various temperatures as shown in Table I below and graphically in FIG. I of the attached drawing which constitutes part of this application. Preheating and transfer were both carried out on the melting point apparatus described above.

TABLE I

| Preheat Temperature | Transfer Temperature (T) | Extent of Transfer | Symbol Used in Drawing |
|---|---|---|---|
| 80°C | 56°C | None | O |
| 85 | 70 | None | O |
| 85 | 77 | Very slight | Ø |
| 86 | 80 | None | O |
| 86 | 84 | Slight | ⊕ |
| 88 | 75 | Very slight | Ø |
| 90 | 66 | None | O |
| 90 | 77 | Good | ● |
| 91 | 80 | Very slight | Ø |
| 92 | 84 | Good | ● |
| 94 | 70 | Fair | ⊕ |
| 95 | 75 | Fair | ⊕ |
| 95 | 78 | Good | ● |
| 96 | 58 | Very slight | Ø |
| 100 | 56 | Fair | ⊕ |
| 100 | 65 | Fair | ⊕ |

TABLE I-Continued

| Preheat Temperature | Transfer Temperature (T) | Extent of Transfer | Symbol Used in Drawing |
|---|---|---|---|
| 100 | 67 | Fair | ⊕ |
| 100 | 71 | Fair | ⊕ |
| 100 | 71 | Fair | ⊕ |
| 100 | 73 | Good | ● |
| 100 | 74 | Good | ● |
| 100 | 80 | Good | ● |
| 100 | 83 | Good | ● |
| 105 | 71 | Good | ● |
| 105 | 80 | Good | ● |
| 110 | 65 | Very slight | ∅ |
| 110 | 71 | Good | ● |
| 110 | 80 | Good | ● |
| 110 | 82 | Good | ● |
| 112 | 60 | Slight | ⊕ |
| 113 | 58 | Slight | ⊕ |
| 118 | 82 | Good | ● |
| 120 | 58 | Slight | ⊕ |
| 120 | 62 | Fair | ⊕ |
| 120 | 79 | Good | ● |

From the above data, both in tabular form and in graphic form as in FIG. I, it can be seen that good transfer can occur at temperatures as low as 71°C provided the element has been preheated to 105°C or more. This is approximately 16°C below the temperature ($T_2$) required for transfer of the rawstock (the material which received no preheat treatment). A curved line has been drawn in FIG. I to approximately separate the areas of good transfer from those of poor transfer. From this curve it can be seen that, for this particular thermographic element, a temperature of about 87°C represents a critical temperature which is the minimum preheat temperature which is required to cause any lowering of the minimum temperature required for transfer. Note that this temperature (87°C) is, within experimental error, the same as the softening temperature of the rawstock ($T_2$).

EXAMPLE V

The 10 solutions described below all contained 5 ml. of a solution of Crystal Violet dye (C.I. Basic Violet 3), in one of various organic solvents as shown, prepared in a concentration of 2 g. of Crystal Violet per liter of solvent.

| | | |
|---|---|---|
| Solution A | 2.0 g | cellulose acetate butyrate |
| | 2.0 g | polyethylene glycol of average molecular weight 300 |
| | 5.0 ml | Crystal Violet in acetone solution |
| | 20.0 g | total weight, by addition of acetone |

The cellulose acetate butyrate contained about 13 percent acetyl groups, about 37 percent butyral groups and had a viscosity of 1.12 to 1.88 poises as determined by ASTM method D-1343-54T in the solution described as Formula A, ASTM method D-871-54T. The refractive index was 1.475 and the specific gravity 1.20.

| | | |
|---|---|---|
| Solution B | 2.0 g | cellulose acetate butyrate (as in Solution A) |
| | 2.0 g | polyethylene glycol diacrylate (as in Example I) |
| | 5.0 ml | Crystal Violet in acetone |

-Continued

| | | |
|---|---|---|
| | | solution |
| | 20.0 g | total weight, by addition of acetone |
| Solution C | 2.0 g | polyvinyl butyral |
| | 2.0 g | dibutyl phthalate |
| | 5.0 ml | Crystal Violet in methanol solution |
| | 20.0 g | total weight, by addition of methanol |

The polyvinyl butyral had a molecular weight of 41,000, a minimum hydroxyl content of 18 percent (as polyvinyl alcohol), 1.1% acetate (as polyvinyl acetate), and approximately 80 percent butyral (as polyvinyl butyral). The specific gravity was 1.1, and viscosity was 195 cps. (in Ostwald viscometer, 10 percent by weight solution in 95 percent ethanol at 25°C.).

| | | |
|---|---|---|
| Solution D | 1.4 g | polyvinyl butyral (as in Solution C) |
| | 2.6 g | tricresyl phosphate |
| | 5.0 ml | Crystal Violet in methanol solution |
| | 20.0 g | total weight, by addition of methanol |
| Solution E | 1.6 g | polyvinyl formal |
| | 2.4 g | dibutyl phthalate |
| | 5.0 g | Crystal Violet in dichloromethane solution |
| | 25.0 g | total weight, by addition of dichloromethane |

The polyvinyl formal had a molecular weight of 18,000, an hydroxyl contant of 7–9 percent (as polyvinyl alcohol) and an acetate content of 9.5 – 13 percent (as polyvinyl acetate). The specific gravity was 1.2 and viscosity was 50–80 cps. (determined from a solution of 5 g. of the polymer brought up to 100 ml. with ethylene chloride at 20°C.).

| | | |
|---|---|---|
| Solution F | 2.6 g | polyvinyl formal (as in Solution E) |
| | 1.4 g | polyethylene glycol diacrylate (as in Example I) |
| | 5.0 g | Crystal Violet in dichloromethane solution |
| | 25.0 g | total weight, by addition of dichloromethane |
| Solution G | 3.0 g | polymethyl methacrylate |
| | 1.0 g | polyethylene glycol of molecular wt. 300 |
| | 5.0 ml | Crystal Violet in dichloromethane solution |
| | 25.0 g | total weight, by addition of dichloromethane |

The polymethyl methacrylate was a white granular solid, having a specific gravity of 1.19 and a refractive index of 1.493 at 25°C. The heat distortion temperature at 264 lb./sq. in. was 72°C. by the ASTM method D-648-45T.

| | | |
|---|---|---|
| Solution H | 0.8 g | polymethyl methacrylate (as in Solution G) |
| | 3.2 g | dibutyl phthalate |
| | 5.0 ml | Crystal Violet in dichloromethane solution |
| | 25.0 g | total weight, by addition of dichloromethane |
| Solution I | 12.0 g | of a 30% by weight solution of polyester in acetone |
| | 0.4 g | polyethylene glycol of molecular wt. 300 |

-Continued

| | | |
|---|---|---|
| | 5.0 ml | Crystal Violet in acetone solution |
| | 20.0 g | total weight, by addition of acetone |

The polyester was the condensation product of terephthalic, isophthalic and sebacic acids, in the proportion of 33/17/50, respectively, and ethylene glycol. A methyl ethyl ketone solution containing 30 percent by weight of the polyester had a viscosity of 200–320 cps. at 25°C.

| | | |
|---|---|---|
| Solution J | 3.0 g | polystyrene |
| | 1.0 g | tricresyl phosphate |
| | 5.0 ml | Crystal Violet in dichloromethane solution |
| | 25.0 g | total weight, by addition of dichloromethane |

The polystyrene had a specific gravity of 1.05 – 1.07 (ASTM method D-792-50), a refractive index of 1.59 (ASTM method D-542-50) and a total luminous transmission of 89–90 percent (ASTM method D-1003).

After thorough stirring, each of the solutions, A through J, were coated to a wet thickness of 0.006 inches on 0.001 inch-thick polyethylene terephthalate film which had been biaxially oriented and heat set, then dried in air at room temperature. With several of the coatings it was first necessary to apply a conventional, thin subbing layer to the polyethylene terephthalate film to insure adequate anchorage.

Samples of the coatings were placed in contact with pieces of bond paper and pressed together against a heated surface in a manner similar to that described in Example IV so that the minimum temperature could be determined at which transfer of part of the coated material to the bond paper could occur. This transfer temperature was determined for each coating at three different times, designated in the table below as:

$T_1$ - transfer temperature immediately after coating and drying $T_2$ - transfer temperature after aging for one day at room temperature $T_3$ - transfer temperature of aged coatings which, immediately prior to recording of transfer temperature, had been preheated $T_1$ is the transfer temperature of the relatively less stable state of the composition which prevails immediately after coating. The composition gradually reverts to the relatively more stable state during the aging period at the end of which the transfer temperature has increased to $T_2$. By preheating the coating to a temperature above or about equal to $T_2$, the thermoplastic composition changes to its relatively less stable state having a lower transfer temperature, $T_3$. It can be seen that $T_1$ and $T_3$are, within experimental error, equal to one another, indicating a complete reversibility of the change from the relatively less stable to the relatively more stable state.

TABLE II

| Coating from Solution | Temperatures in °Centigrade $T_1$ | $T_2$ | $T_3$ | Preheat Temperature |
|---|---|---|---|---|
| A | 125 | 132 | 126 | 135 |
| B | 84 | 96 | 84 | 100 |
| C | 120 | 126 | 120 | 128 |
| D | 64 | 70 | 62 | 120 |
| E | 132 | 142 | 132 | 140 |
| F | 130 | 148 | 130 | 150 |
| G | 130 | 150+ | 135 | 200 |
| H | 65 | 94 | 65 | 120 |
| I | 85 | 110 | 85 | 120 |
| J | 58 | 67 | 56 | 120 |

EXAMPLE VI

Repeated reversibility of the thermoplastic compositions, from the relatively more stable to the relatively less stable states, was demonstrated with samples of the coating of Solution B of Example V, measuring transfer temperatures as in that example. Aging of the coating was at room temperature, while the preheat temperature was, in each case, 120°C.

| | Transfer Temperatures Without Preheat | With Preheat |
|---|---|---|
| Freshly dried coating | 84°C. | — |
| After 7 days aging | 89°C. | 73°C. |
| After 3 more days aging | 89°C. | 73°C. |
| After 1 more day aging | 89°C. | 73°C. |
| After 1 more day aging | 89°C. | 73°C. |
| Total: 12 days aging | | |

The coating of Solution D of Example V was tested in a similar manner, with the following results:

| | Transfer Temperatures Without Preheat | With Preheat |
|---|---|---|
| Freshly dried coating | 64°C. | — |
| After 2 days aging | 69°C. | 55°C. |
| After 3 more days aging | 76°C. | 65°C. |
| After 1 more day aging | 74°C. | 65°C. |
| After 1 more day aging | 76°C. | 60°C. |
| Total: 7 days aging | | |

In order to increase sensitivity in the thermal exposure step of this process it may be desirable to heat the thermographic element to a temperature just below the threshold temperature for image formation. Thus, for example, in the method of thermal exposure described in Example II, the infrared absorbing backing layer may be provided with heating means as also described in Cohen & Holland, U.S. Pat. No. 3,073,953.

In the foregoing examples, the respective thermoplastic organic polymers (including copolymers) are amorphous polymers. Also, the plasticizers of the examples, namely, the polyethylene glycol diacrylate, polyethylene glycol, dibutylphthalate, and tricresyl phosphate, are plasticizers that are normally liquids, that is, at normal room temperature and pressures.

In the above examples, the abbreviation "CI" refers to the Colour Index, 2nd Edition 1956, The Society of Dyers and Colourists, Dean House, Picadilly, Bradford, Yorkshire, England, and The American Association of Textile Chemists and Colorists, Lowell Technological Institute, Lowell, Mass., U.S.A.

The processes of the present invention are useful for a variety of copying, printing, decorative and manufacturing applications. Pigments, e.g., $TiO_2$, colloidal carbon, metal powders, phosphors, etc., and dyes can be incorporated in the thermoplastic polymeric layer, and by use of the instant process, images can be transferred to a receptor support. The process is also useful for preparing multicolor reproductions. Colorless constituents which form colored compounds when heat is applied or brought into contact with other color forming components are useful in the instant transfer process. Reflex exposures can be used for any of these applications provided the base support is capable of transmitting infrared radiation, and is especially useful in copying from original messages on supports which may have low transmission of infrared radiation.

Lithographic surfaces can be produced by thermally transferring a hydrophobic layer to a hydrophilic receptor surface or vice versa. Alternatively, the exposed areas of the photopolymerizable composition, after the underexposed areas are transferred, can be used as a lithographic offset printing plate if they are hydrophobic and the original sheet support is hydrophilic or vice versa. Silk screens can also be made by this process.

The images formed by the thermographic process of this invention are not only useful for making copies of original images by dry methods as indicated above, but by transfer of the exposed areas to a receptor support the thermoplastic surface can be treated with, e.g., aqueous solutions, dyes, inks, or magnetic particles to form modified images. Colored copies of the original image can be obtained when the wet surface is brought into intimate contact with a receptor support and the surfaces separated. Solvents which are used for the spirit copying, e.g., ethanol, water, etc. should meter out the dye used and be a non-solvent for the polymer, i.e., the solubility of the dye and binder are important factors in selecting the solvent. The process is also useful because it permits the rapid examination of the printing qualities, e.g., of separation negatives and positives, under conditions simulating true printing. Dusting and stripping techniques are useful in making such things as printed circuits, electrically conducting or photoconductive matrices, phosphor and ceramic patterns, planographic printing plates and filters. After dusting or stripping the elements may also be useful for image transfer to a suitable receptive surface.

The instant process has the advantage that by a simple procedure, involving the use of heat in a dry system, copies of images which are of high quality and stability are obtained rapidly. The process is very versatile, i.e., it is useful in copying, e.g., multicopying, printing, silk screen processes and in color reproduction, including multicolor reproduction. Both line and halftone images can be transferred simultaneously. Furthermore, the transfer process gives copies on standard paper with no background color which are stable to heat, light, etc. Still further advantages will be apparent to those skilled in the art of image formation.

The embodiments of the invention in which an exclusive property or privilege is claimed are defined as follows:

1. An image-forming process which comprises 1. heating, imagewise, to a temperature above a softening temperature $T_2$, but below the thermal decomposition temperature thereof, a layer that is solid at normal pressure below 40°C. consisting essentially of a mixture of a thermoplastic, amorphous, organic polymer of a molecular weight above 10,000 and a normally liquid plasticizer therefor, said mixture being capable of existing
   a. in a metastable state at 20°C. having a softening temperature $T_1$, and
   b. in a stable state at 20°C. and having a softening temperature $T_2$ at least 10°C. above $T_1$ while said polymer is in the latter stable higher softening state, for a period sufficient to convert the stable polymer to the metastable state,
2. bringing the entire surface of the layer to a temperature T between temperatures $T_1$ and $T_2$, whereby the imagewise heated areas are softened and will adhere to surfaces, and the remaining areas are firm and non-adherent, and
3. converting the softened, exposed image areas to a visible image.

2. A process according to claim 1, wherein said period of imagewise heating is from 1 millisecond to 60 seconds.

3. A process according to claim 1, wherein said layer is on a thin infrared radiation-transmitting support and said polymer is a copolymer.

4. A process according to claim 1, wherein said polymer is cellulose acetate butyrate.

5. A process according to claim 1, wherein said polymer is polyvinyl butyral.

* * * * *